Nov. 12, 1968   E. J. ESCHENROEDER ET AL   3,410,429
METHOD AND APPARATUS FOR CAKE DEPANNING
Filed Aug. 16, 1966   4 Sheets-Sheet 1

INVENTORS
EDWARD J. ESCHENROEDER
FRANK P. McDOWELL
BY
Cushman, Darby & Cushman
ATTORNEYS

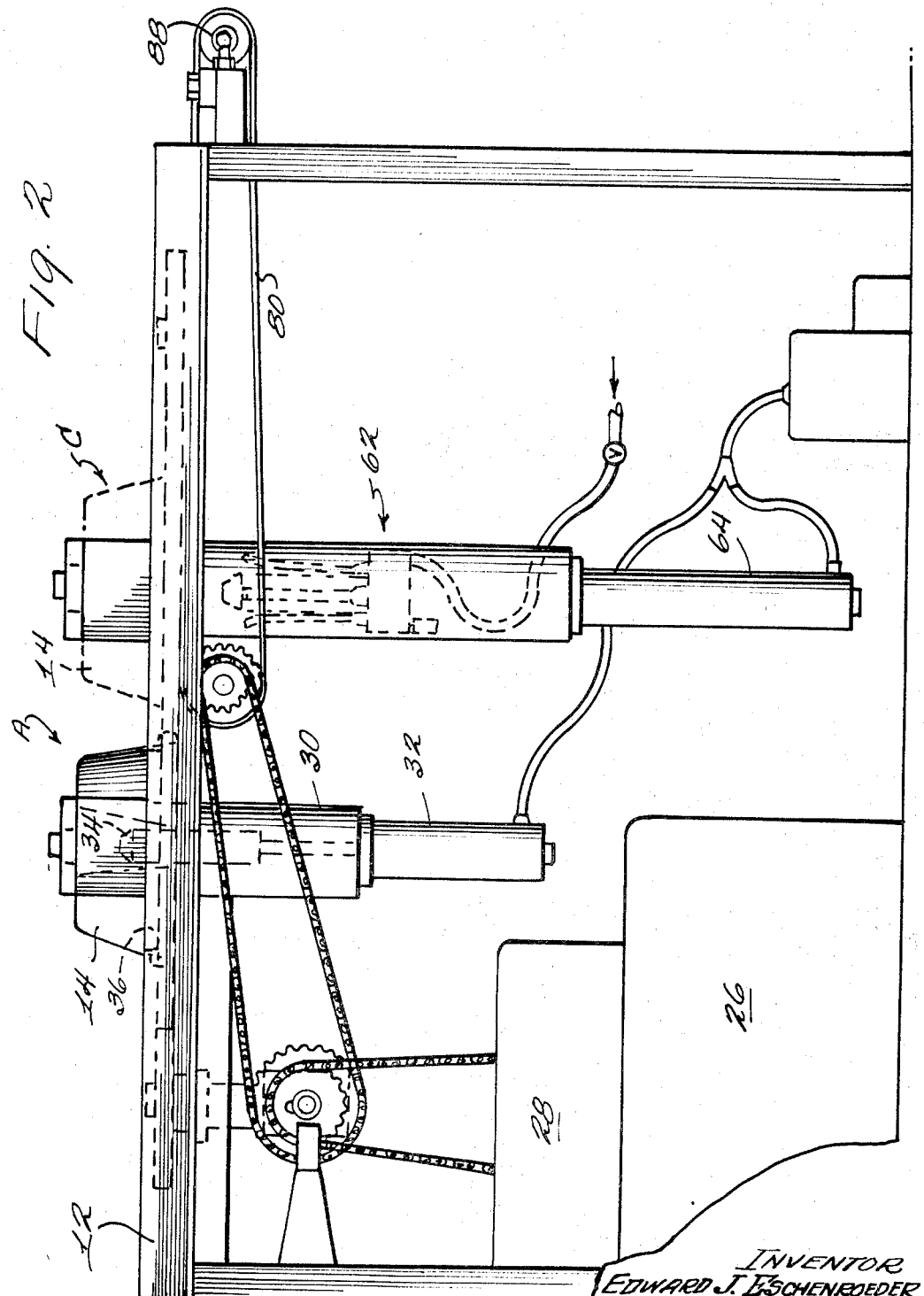

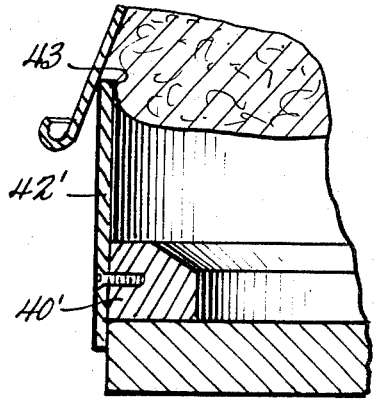
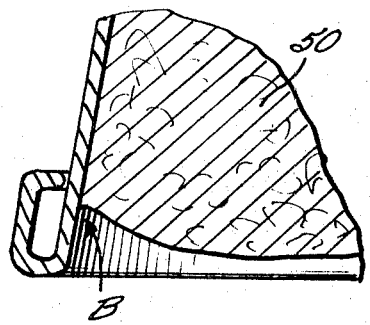
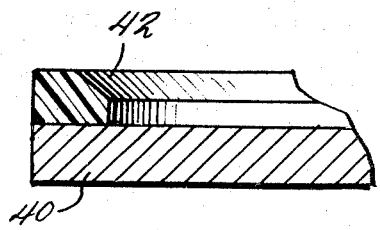
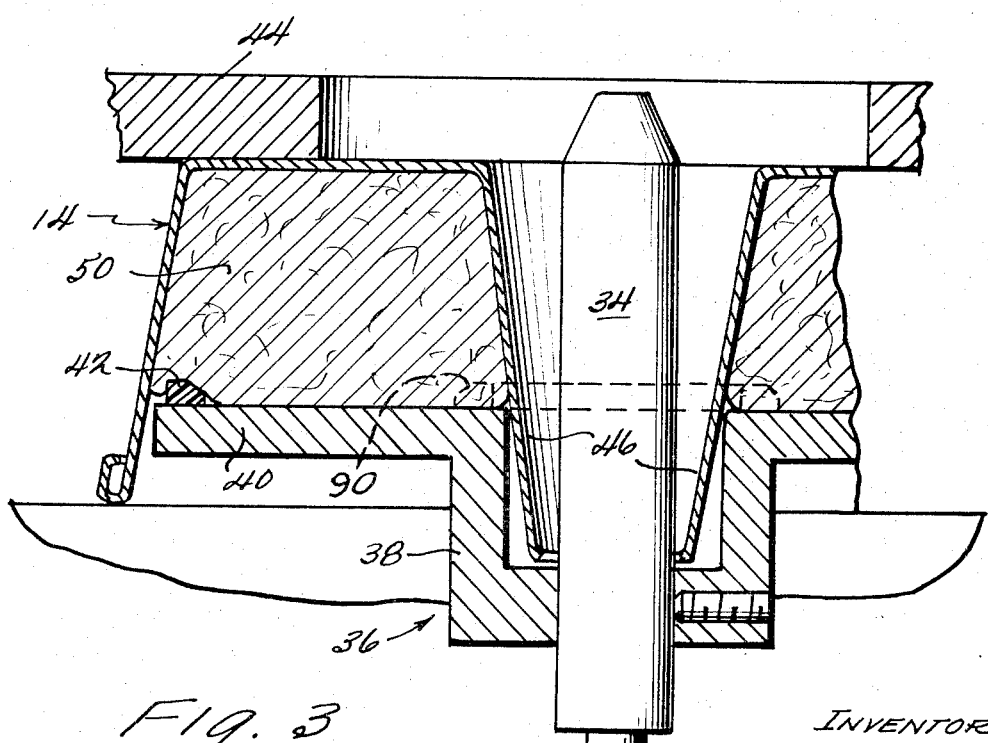

Nov. 12, 1968  E. J. ESCHENROEDER ET AL  3,410,429
METHOD AND APPARATUS FOR CAKE DEPANNING
Filed Aug. 16, 1966  4 Sheets-Sheet 4

INVENTORS
EDWARD J. ESCHENROEDER
FRANK P. McDOWELL
BY
Cushman Darby & Cushman
ATTORNEYS

United States Patent Office 3,410,429
Patented Nov. 12, 1968

3,410,429
METHOD AND APPARATUS FOR
CAKE DEPANNING
Edward J. Eschenroeder, Cincinnati, and Frank P. McDowell, Columbus, Ohio, assignors to The Kroger Co., Cincinnati, Ohio, a corporation of Ohio
Filed Aug. 16, 1966, Ser. No. 572,791
9 Claims. (Cl. 214—310)

ABSTRACT OF THE DISCLOSURE

Apparatus is provided for effecting the sequential, essentially two-step method of efficiently depanning bakery products, and particularly angel food cakes, from their pans in an assembly-line operation. In the preferred operation, the angel food cake-containing pans are inverted and placed upon a conveyor which automatically carries the pans individually to successive indexing stations. At the first such station, an automatically actuated cylinder presses a solid member, preferably in the form of an annular ring, against the crusty seal which forms a junction between the cake material and the sides of the pan, to generally rupture that seal. At the second indexing station, hollow fingers are automatically inserted into the cake pan, so as to extend between the cake material and the pan surfaces. Compressed air is then expelled through the fingers generally toward the bottom of the pan so that the entire cake is dislodged from the pan surfaces to complete the method of removal. Variations in the shape and number of solid members for initially rupturing the cake-pan seal are contemplated.

---

This invention relates to apparatus and methods for automatically depanning bakery products and particularly for removing angel food cakes from the pans in which they are baked in a commercial operation.

In the mass production of bakery goods in commercial bakeries, the product commonly adheres or sticks to the pan or container in which it is baked, and the efficient, economical removal of the bread or cake product from the pans has long presented problems to the commercial baker. Commonly, as the goods are removed from the oven, they are placed on conveyor mechanisms which remove the cake and pan from the immediate area of the oven and, simultaneously, allow the cake to cool to a degree. Normally, it is desirable for the cakes to be depanned soon after removal from the oven, while the pans are still warm and before the cake crusts can cool completely and harden in the pan.

For many years, acceptable depanning of baked goods has been accomplished only by means of routine manual operations. Although, as we are aware, there have been a number of suggestions in the past of ways and means for mechanically removing baked goods from their pans, by and large, the commercial bakeries have found that such mechanical operations have not proven entirely satisfactory, and manual performance of the depanning operation has remained, by default, the preferable mode of depanning cakes and other baked goods. Manual removal of cakes from their pans, for example, requires the handling of the warm pans by an operator who then raps or strikes them sharply against a rigid structure to separate the cake from the sides of its pan. Due to the still elevated temperature of the pan, the laborer ordinarily must wear heat insulating gloves, but such gloves naturally reduce the operator's dexterity, with resulting loss of speed and efficiency in his ability to rapidly depan the cakes. In addition, when the cake is more securely stuck to the pan, several blows to the edge of the pan may be required to dislodge the cake, and the physical forces involved often cause dents or other injuries to the pan, thus requiring later repairs or replacing of the pans and further increase in the costs of the total baking operation.

In addition, removal of angel food cakes from the pans normally present greater difficulties than other baked goods because of the shape of the pan. That is, the central horn protrusion of the pan tends to obstruct removal of the cake by limiting the directions that the cake material can move relative to the pan, and by reason of the fact that the hard "crust line" which tends to form at the junction between the upper, outer surface of the cake and the pan surface is present around the periphery of the central horn as well as around the outer periphery of the bowl portion of the pan. Also, angel food cake is one of the more delicate bakery products, and has a tendency to crumble or break when subjected to strong physical forces, such as those produced when the cake pan is sharply struck against a rigid surface.

Accordingly, it is an object of the present invention to provide means and methods for efficiently and economically removing baked goods from their pans after the products are removed from the baking oven.

It is another object of the present invention to provide means for removing bakery products, and particularly angel food cakes, from the pans in which they are baked without subjecting the cakes and pans to sudden forces which tend to break or crumble the cake and dent or injure the pans, thus reducing their subsequent usefulness.

It is a further object of our invention to provide a novel method for rapidly and efficiently depanning angel food cakes by the application of controlled compressive and pneumatic forces and without the necessity for manual performance of any part of the depanning process.

It is another object of the present invention to provide means which sequentially apply compressive pneumatic forces to the angel food cake material in order to separate and dislodge it from its pan in an automatically controlled sequence, without requiring manual intervention during the depanning process.

Other and further objects of the present invention will readily become apparent to those skilled in the art from the following detailed description, and from the appended drawings in which:

FIGURE 2 is a side elevational view of the depanning apparatus shown in FIGURE 1;

FIGURE 3 is a partial sectional view, in elevation, illustrating a cake under compression at the first depanning station;

FIGURE 4 is a fragmented sectional view showing the annular compression ring of FIGURE 3 in more detail;

FIGURE 5 is a fragmented sectional view of the outer bowl portion of a cake pan, with an exaggerated portrayal of the crusty junction between the cake material and the outer pan surface;

FIGURE 8 is a fragmented sectional view of a modified annular compression ring.

In the commercial baking of angel food cakes, the cakes are baked in a standard pan of ring-shaped cross-section, having a bowl portion which holds the cake and a central horn, or cone-shaped, portion which provides for the vertical opening in the completed cake.

Figure 1:
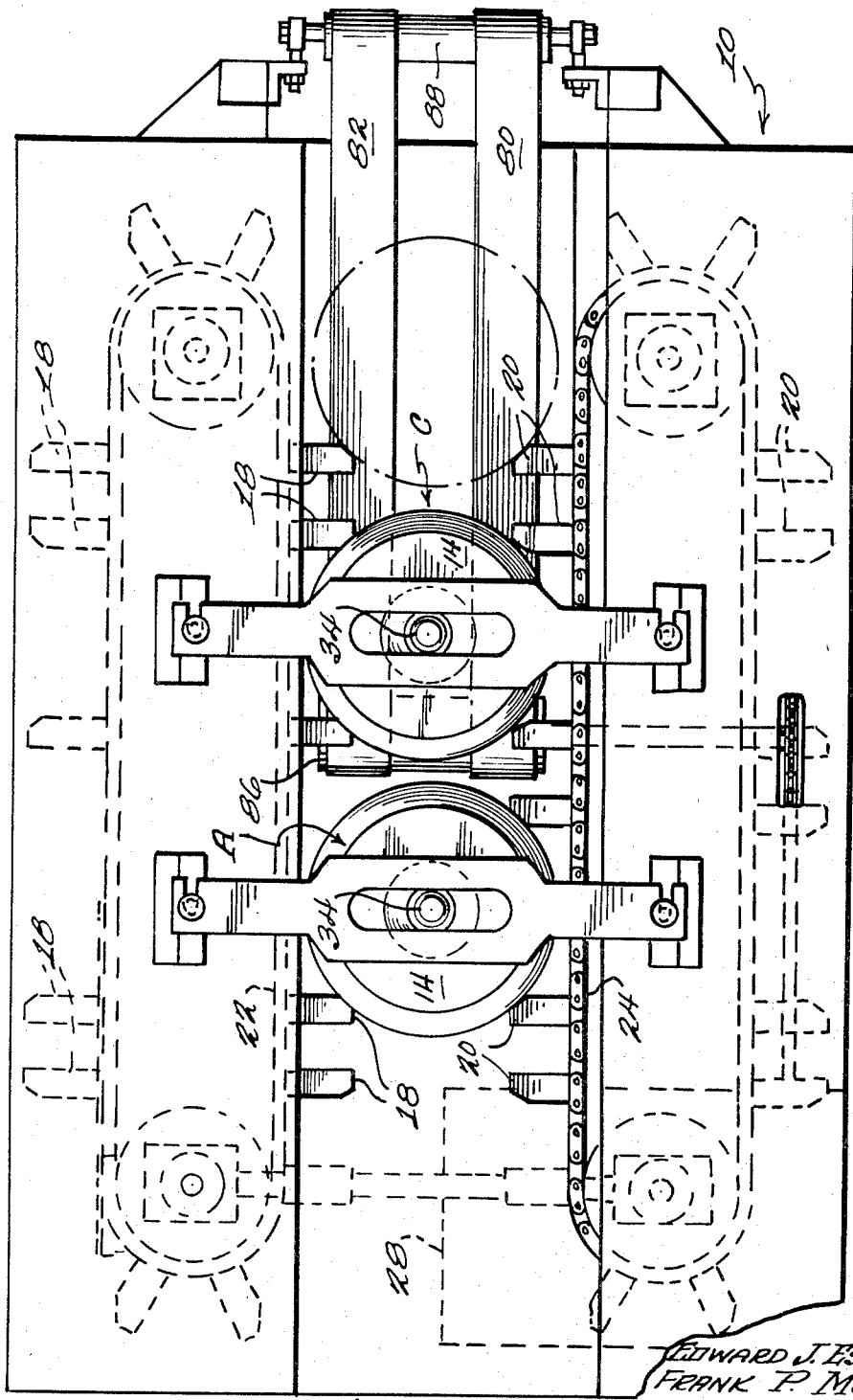
FIGURE 1 is a plan view of the depanning apparatus, illustrating a cake pan located at each indexing or depanning station.

FIGURE 1, which is a plan view of our apparatus for removing the cakes from their pans, illustrates a table 10 having a conveyor system generally designated by the numeral 12, extending longitudinally the length of the table. As shown in FIGURE 1, the cake-containing pans 14 move in an inverted position generally from left to right. While it is apparent that the cake pans 14 may be manually placed on the table for depanning, preferably the left-hand side of the table is adapted to receive the pans in an inverted position from a cooling conveyor (not shown), which carries the pans from the immediate area of the baking ovens. A short in-feed belt conveyor may be employed to receive the pans from such a cooling conveyor and move them onto the table 10 to a point where their movements will be controlled by the indexing mechanism described below.

As the pans move onto the table 10, they are engaged by the fingers 18 and 20 of the indexing chains 22 and 24. As shown by the solid and dotted lines of FIGURE 1, the indexing chains 22 and 24 are driven together so that fingers 18 and 20 cooperate to hold and move an individual pan as herein described.

Both indexing chains are powered by a motor 26 (see FIG. 2), which drives a Geneva-type mechanism 28, including a suitable cam, that provides an alternating stop-and-go movement to the indexing chains. Suitable Geneva-type mechanisms of various designs well known to those skilled in the art may be employed for this purpose, and, therefore, the particular design does not require further amplification and explanation.

The indexing chains 22 and 24 are adapted to initially move the inverted pans 14 to the first indexing station, indicated generally by the position of the pan A in FIGURE 1, and there hold the pan stationary.

At this first indexing station, there is located beneath the pan a vertically disposed plunger mechanism 30 which is actuated by an air cylinder 32. Toward the lower end of the plunger spindle 34, there is rigidly attached an annular depressor assembly 36, which is adapted to move vertically with the spindle. This depressor assembly, which is better shown in FIGURE 3, has a base portion 38 attached to the plunger spindle 34, an annular flange portion 40, and an annular ring portion 42, extending upwardly and outwardly from the annular flange portion 40. This ring 42 may be formed of Neoprene or other heat resistant material having qualities of flexibility and wear resistance, for the purposes hereinafter described. Above the inverted pan at this first indexing station is a hold-down bar 44 disposed a few fractions of an inch above the top of the pan as it sits at the indexing station. The plunger spindle 34 is tapered at its head and of a size and shape so that it may just enter through the opening in the central horn portion 46 of the pan, and thus center the pan in the desired position.

As the pan 14 is brought to a stop at this station, the cam which controls the motion of the indexing chains also actuates a switch which in turn causes the air cylinder to drive the spindle 34 upward toward and into the horn 46. As the plunger spindle 34 rises through the horn portion, the annular flange portion 40 of the depressor assembly 36 also passes over the top of the horn portion 46 and moves upward until the ring 42 engages and compresses the outer periphery of the cake material 50, as shown in FIGURE 3, breaking the compressed portions of the cake away from the adjacent pan surface. Although this figure illustrates the completed compression of the cake material, it should be understood that the circular ring 42 preferably initially contacts the cake in the immediate vicinity of the junction of the cake material and the pan. Then, as the depressor assembly moves further upward, the ring 42 depresses the cake material to break same away from the pan surfaces. If the ring comes in contact with the pan surfaces before it has completed its upward travel, the ring surfaces may flex slightly inwardly to conform to the decreased diameter of the pan. The upward movement of the ring 42 is limited by the pneumatic cylinder 32 so that the cake material 50 is depressed or compressed about 1 inch from its normal vertical dimension (for a standard sized cake). Since the hold-down bar 44 restricts the vertical movement of the pan, in operation the extent of the compression may properly vary by fractions of an inch, depending upon the tendency of the pan to rise under the force exerted by the ring 42 against the hold-down bar. However, any variation in the amount that the cake is compressed at this station is not critical and may be desirable, depending upon the texture of the particular cake. In all cases, however, it will be seen from the above description, that depression of the outer layers of the cake material by the ring 42 will rupture the crusty seal, indicated at B in FIGURE 5, between the outer peripheral edges of the cake and the bowl portion of the pan, and will separate the adjacent edges of the cake from the pan to a depth approximtaely equal to the depth of the cake depression.

In order that the cake not be damaged or permanently set by the foregoing depression operation, the ring 42 should preferably be held in its uppermost position for only a second or so, and then the spindle together with the ring should be retracted entirely so that the pan 14 may be moved by the cam-controlled indexing chains 22 and 24 to the second depanning station.

This second station is indicated in FIGURE 1 by the pan positioned generally at C. Once again, there is a hold-down bar 60, having a central vertical opening, provided immediately above the second plunger mechanism 62. This plunger, like the first, is adapted for vertical movement and is driven by means of a second air cylinder 64. It should be understood that both of the air cylinders 32 and 64 are double-acting, so that the respective spindles can be both raised and retracted rapidly under pneumatic force. Since, for greater efficiency, both stations should operate at the same time, cylinder 64 may preferably be actuated at the same time and by the same switch as cylinder 32.

Figures 6, 7:
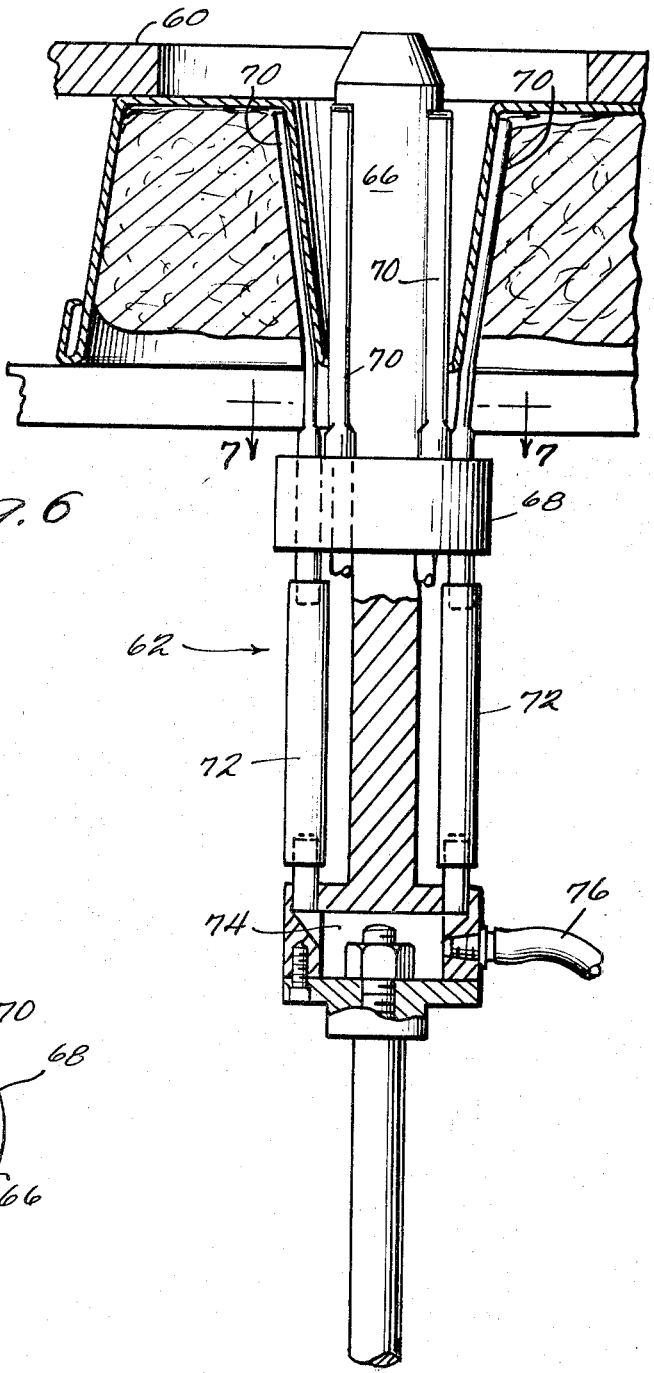
FIGURE 6 is a partial sectional view, in elevation, showing a cake being dislodged from its pan at the second depanning station.
FIGURE 7 is a sectional view of the pneumatic fingers of the present apparatus, taken along lines 7—7 of FIGURE 6.

As best shown in FIGURE 6, the plunger mechanism 62 comprises a central spindle 66 which, like spindle 34, is adapted to enter the horn portion of the pan, and thus center the same, and an annular ring 68 disposed around the spindle 66, which is adapted to carry a plurality of upwardly directed hollow fingers 70. Each of the fingers 70 are adapted to serve as conduits for compressed air, and they are each provided with extensions 72 which connect to a central source of air 76. The upper ends of each of the fingers 70 are open for the discharge of air. As indicated in FIGURE 6, each of the fingers 70 is long and tapering, and bends outwardly away from the spindle 66 near the base so as to conform to the slope of the pan horn 46 for reasons which will become apparent hereinafter. As shown by FIGURE 7, the upper ends of the fingers have an elongated oval cross-section and are arranged so that the major axis, corresponding to the long side, of each such finger is substantially tangent to a circle having its center located on the longitudinal axis of the spindle 66. Thus, the open ends of the fingers are shaped so that they may be wedged between the cake material and the pan surfaces without substantial tearing or breaking of the cake, as hereinafter described.

As the pan 14 stops at this second indexing station, the air cylinder 64 is actuated to move the spindle 66 through the opening of the horn 46. The height of the fingers 70 is such that after the nose of the spindle 66 is centered in the pan, the fingers 70 contact the cake side of the pan horn and move upwardly between the recently dislodged cake and the pan horn. Since the crust between the cake and the horn has been ruptured by the compression of the cake at the first indexing station, as hereinbefore described, the fingers 70 may move without obstruction upwardly along the horn surface and past the softer inner layers of cake toward the bottom of the pan.

When the ends of the fingers 70 reach a point substantially at the bottom of the inverted pan, a switch associated with the spindle 66 is actuated to automatically introduce a blast of compressed air through the line 76 and the individual conduits 72 to the fingers 70. This pressurized air is communicated to the area of the bottom of the pan and tends to blow or force the cake material away from the pan surface as shown in FIGURE 6. Generally, the dislodging effect of the air begins along the bottom surfaces of the pan and then extends downwardly (since the pan is inverted) along the sides as the bottom is loosened and the air expands into the cavity thereby created. As will be appreciated, the pressure of the air is not so great as to violently rupture the cake material by causing an explosion of air, but is sufficient to expel any cake particles which block the oval-shaped opening at the end of the fingers and effectual to impart an expelling force to the cake material sufficient to break or rupture the crusty particles adhered to the pan surface. We have found that a plenum chamber pressure of about seventy to ninety-five pounds per inch, with eighty-five pounds per square inch being preferable, will accomplish the purposes of our invention.

After this blast of air, the spindle 66, together with the fingers are retracted under the force of the pneumatic cylinder 64, and the indexing chains then automatically move the pan 14 past the second indexing station where its subsequent movement may be controlled by the twin conveyor belts 80 and 82, toward the right-hand end of the table 10. As shown in FIGURE 1, the belts 80 and 82 lie to the sides of the spindle mechanism 62 so that they do not engage or interfere with the fingers 70 and spindle 66 during their vertical movements. The belts may be driven from the same motor that drives the indexing chains, and are supported and driven by rollers 86 and 88.

In operation, the cakes are individually carried, in sequence, through the depanning stations by the indexing chains, as aforesaid. It will now be understood that the inverted cake-filled pan is first held in place at the first station momentarily while the depressor ring 42 compresses the cake material upwardly, in a direction substantially normal to the bottom of the cake pan. Then the ring and associated spindle 34 are retracted below the level of the pan to permit it to be moved along on the table. The motion of the Geneva mechanism causes the indexing chains 22 and 24 to move the pan to the second station where it is then centered and held by the spindle 66, with the fingers 70 at the same time entering into the pan between the cake and the pan surface. Then the short blast of compressed air acts to dislodge the cake from the pan, as aforesaid, whereupon the finger mechanism and spindle are also automatically retracted. From the second station, the indexing chains and conveyor belts 80 and 82 cooperate to carry the cake pan to the end of the table 10 where the belts 80 and 82 may discharge the cake and pan to still another conveyor.

After the cake and pan leave the second station, the cake is so dislodged from the pan surface that the pan may merely be lifted away from the cake, and this may be done at any subsequent point by either mechanical or manual means, as desired. When the pan is removed, the cake is found to be free of the broken portions which are commonly encountered in manual depanning operations.

It will also be seen that the depanning procedure above described can be completed at a uniformly rapid rate with efficiency and economy. It is, of course, now to be understood that while a given cake pan is indexed to the second station, as described, a second pan will be indexed to the first station at the same time for the first phase of the automatic depanning operation. Thus, at least two pans may be undergoing depanning concurrently.

In addition to the compression of the cake material, as heretofore described, by the annular ring 42, it may also be desirable to compress and dislodge the cake material along the inner periphery of the cake where it contacts the horn portion of the pan. To accomplish this purpose, the annular flange 40 may be modified by the addition of a second compression ring 90, indicated by dotted lines in FIGURE 3. This ring 90 is, of course, similar to ring 42 and adapted to compress the cake material adjacent to the surfaces of the horn. It should be understood, however, that regardless of whether the single ring 42 or both rings 42 and 90 are employed, only the rings cause any substantial compression of the cake material and the surface of the flange 40 preferably does not come into contact with the cake.

FIGURE 8 illustrates a further modified form of compression ring which is useful in our method of cake depanning. As shown in FIGURE 8, the modified element comprises a thin-walled annular ring 42′ which extends perpendicularly above the annular flange 40′. Typically this modified ring 42 may comprise a ⅜₁₆″ thick section of Hycar belting. This belting may be secured, as illustrated, by suitable supporting means to the flange 40′. When this modified ring 42′ is employed in the manner heretofore described at the first indexing stage, an upper edge or surface 43 of the ring preferably contacts the inner surface of the bowl portion of the pan at or below the junction of the cake material and the pan, and then slides upwardly along the pan surface, flexing slightly inwardly as the bowl diameter decreases. As the edge contacts the cake crust, the latter will be severed and broken and the ring may continue to move upwardly for a short distance along the pan surface, thus effecting separation of the cake from the adjacent pan surfaces and scrubbing the surfaces of cake particles. It will be seen, however, that the modified ring 42′ accomplishes the same purposes as ring 42, described hereinabove, in preparing the cake for eventual complete dislodging, and that the other apparatus and subsequent steps otherwise remain generally the same as described above.

Although the preceding description has uniformly referred to air as the fluid medium used to break the bottom and sides of the cake free from the pan, it should be understood that other gases, nontoxic and noninjurious to the cake, may also be used for the purposes described. However, because ordinary air is relatively inexpensive, the use of this fluid is naturally preferred over other possible substitutes.

While the method and apparatus hereinabove described may be regarded as a preferred embodiment, it will also be appreciated that numerous details of the structure and arrangement shown may be altered or omitted without departing from the spirit of our invention, and it should therefore be understood that our invention is not to be limited to the precise means and modes described. Accordingly, the scope of the invention is to be construed and defined by the appended claims.

We claim:

1. The method of depanning an angel food cake from the pan in which it is baked, which comprises pressing an annular member against the crusty portion of the cake sealing the cake material to the pan surface at the cake's outer periphery to rupture said seal and dislodge the outer periphery of the cake from the adjacent portions of the pan, and subsequently introducing air past said dislodged portions of the cake to the bottom of said pan in order to separate and dislodge the remainder of said cake from the pan.

2. The method of depanning an angel food cake from the pan in which it is baked, which comprises pressing an annular member against the crusty portion of the cake sealing the cake material to the pan surface at the cake's outer periphery to rupture said seal and dislodge the outer periphery of the cake from the adjacent portions of the pan, inserting a plurality of air conduits between the pan surface and the loosened cake material so that an open end of each of said conduits extends to the bottom of the pan, and then introducing air through said conduits under pressures on the order of about 70 to 95 pounds per inch to separate the cake material from the bottom of the pan, whereby the entire cake is dislodged from the pan.

3. The method of removing an angel food cake from the pan in which it is baked, which comprises inverting said pan, pressing an annular member against each of the concentric crusty surfaces sealing the cake material to the outer bowl portion of the pan and to the inner adjacent horn portion of the pan to rupture said seals and dislodge the cake material from the said portions of the pan, inserting fluid conduits between the horn portion of said pan and the adjacent dislodged portion of the cake, so that an air outlet on said conduit is disposed toward the bottom of said pan, and forcing air through said conduits to the bottom of said pan so as to forcibly dislodge the remainder of said cake material and separate same from the pan.

4. Apparatus for removing angel food cakes from the pans in which they are baked, comprising means for advancing and indexing an inverted cake-containing pan to a first depanning station, means associated with said first station for depressing the outer periphery of the cake material to separate the outer portions of the cake material from the adjacent portions of the pan, means for moving said cake-containing pan to a second station, a plurality of substantially vertically disposed fluid conduits each having a discharge opening located at the upper end thereof, means associated with said second station for inserting said fluid conduits between the said dislodged cake material and the adjacent pan surfaces so that the discharge openings of the conduits extend toward the bottom of the pan, and means for forcing air through each of said conduits to the bottom of said pan so as to dislodge the remainder of the cake material from said pan.

5. Apparatus as defined in claim 4 wherein said depressing means is adapted to apply compressive force against substantially all of the exposed surface of the empanned cake, to separate said outer portions of the cake material from the adjacent surfaces of the pan.

6. Apparatus as defined in claim 4 wherein the cake pans are of the type having an annular bowl portion and a central horn portion with a vertical opening at the apex of said horn portion, and wherein said depressing means is adapted to separate said outer cake material from both the adjacent bowl and horn surfaces of the pan.

7. Apparatus as defined in claim 6 wherein said depressing means associated with the first station comprises an annular ring adapted to move past the horn portion of the pan against the outer surface of the cake, and momentarily compress the cake material in the dimension normal to the bottom of the pan.

8. Apparatus as defined in claim 6 wherein the fluid conduits each comprise an elongated finger having a passageway therethrough, and each of said fingers is shaped and adapted to conform generally to the slope of the outer surface of the pan horn when said fluid conduits are inserted into said pan.

9. Apparatus as defined in claim 7 wherein the fluid conduits each comprise an elongated finger having a passageway therethrough, and each of said fingers is shaped and adapted to conform generally to the slope of the outer surface of the pan horn when said fluid conduits are inserted into said pan.

References Cited

UNITED STATES PATENTS

| | | |
|---|---|---|
| 2,271,937 | 2/1942 | Engels. |
| 2,795,344 | 6/1957 | Lubischer. |
| 3,272,361 | 9/1966 | Vogel et al. _____ 214—310 |

HUGO O. SCHULZ, *Primary Examiner.*